(12) United States Patent
Kimura et al.

(10) Patent No.: US 6,799,656 B2
(45) Date of Patent: Oct. 5, 2004

(54) CONTROL APPARATUS FOR MOTOR-DRIVEN POWER-STEERING SYSTEM OF MOTOR VEHICLE

(75) Inventors: Kazushi Kimura, Hyogo (JP); Kazunori Miura, Hyogo (JP); Shigeki Ohtagaki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 22 days.

(21) Appl. No.: 10/231,210

(22) Filed: Aug. 30, 2002

(65) Prior Publication Data
US 2003/0168276 A1 Sep. 11, 2003

(30) Foreign Application Priority Data
Mar. 5, 2002 (JP) ........................................ 2002-058606

(51) Int. Cl.⁷ ................................................ B60D 5/04
(52) U.S. Cl. ...................................... 180/446; 180/443
(58) Field of Search ................................. 180/444, 443, 180/402, 446; 701/41, 43

(56) References Cited

U.S. PATENT DOCUMENTS

| | | | |
|---|---|---|---|
| 6,244,373 B1 * | 6/2001 | Kojo et al. | 180/443 |
| 6,354,396 B1 * | 3/2002 | Horton et al. | 180/446 |
| 6,496,762 B2 * | 12/2002 | Kurishige et al. | 701/41 |
| 6,594,568 B2 * | 7/2003 | Matsuoka | 701/41 |
| 6,651,771 B2 * | 11/2003 | Chabaan | 180/446 |
| 2002/0022914 A1 * | 2/2002 | Kawada et al. | 701/41 |
| 2002/0023798 A1 * | 2/2002 | Amakusa et al. | 180/446 |
| 2002/0053481 A1 * | 5/2002 | Itakura et al. | 180/446 |
| 2003/0121716 A1 * | 7/2003 | Yamada et al. | 180/446 |
| 2003/0155172 A1 * | 8/2003 | Kawada et al. | 180/446 |

FOREIGN PATENT DOCUMENTS

| | | |
|---|---|---|
| JP | 3-227770 | 10/1991 |
| JP | 4-31173 | 2/1992 |

\* cited by examiner

Primary Examiner—Daniel G. DePumpo
(74) Attorney, Agent, or Firm—Sughrue Mion, PLLC

(57) ABSTRACT

A control apparatus for a motor-driven power steering system of a motor vehicle includes a steering angular information detecting means (16) for detecting steering angular information of a steering mechanism (3), a controller (10) for controlling a motor current on the basis of the steering angular information and magnitude and direction of a steering torque, an electric motor (7) operatively coupled to the steering mechanism (3) for generating a steering assist torque (Ta) corresponding to the motor current, the assist torque being applied to a steering wheel, a motor-rotational information detecting means (101) for detecting rotational information of the electric motor (7), and an abnormality decision means (17) designed to make decision that the steering angular information detecting means (16; 15) is abnormal when a difference between the steering angular information and the motor rotational information is not smaller than a reference value preset for comparison of both the information.

7 Claims, 12 Drawing Sheets

US 6,799,656 B2

CONTROL APPARATUS FOR MOTOR-DRIVEN POWER-STEERING SYSTEM OF MOTOR VEHICLE

This application is based on Application No. 2002-58606, filed in Japan on Mar. 5, 2002, the contents of which are hereby incorporated by reference.

BACKGROUND OF THE INVENTION

1. Field of the Invention

The present invention generally relates to a control apparatus for a motor-driven power steering system of a motor vehicle (hereinafter also referred to simply as the motor-driven power steering control apparatus) which is adapted to generate a motor current required for generation of a steering assist torque on the basis of steering angular information and a steering torque in the power steering. More particularly, the present invention is concerned with a motor-driven power steering control apparatus which is capable of detecting abnormality of a steering angular information detecting means with high accuracy to thereby ensure enhanced reliability for the control of an electric motor employed in the power steering system.

2. Description of Prior Art

For better understanding of the concept underlying the present invention, description will first be made of a hitherto known or conventional motor-driven power steering control apparatus. FIG. 12 is a block diagram showing schematically, by way of example, a general arrangement of a conventional motor-driven power steering control apparatus which is disclosed in Japanese Patent Application Laid-Open Publication No. 2173/1992 (JP-A-4-2173).

Referring to FIG. 12, a controller 10 designed for controlling an electric motor 7 is supplied with an electric power from an vehicle-on-board battery 1 directly or by way of an ignition switch 2.

A steering mechanism 3 which is interlocked with a handle of a motor vehicle (not shown) includes a steering wheel implemented integrally with the handle for steering the motor vehicle with a steering torque Ts applied to the steering wheel.

The steering mechanism 3 is provided with a torque sensor 4 for outputting a detection signal indicating the steering torque Ts applied upon steering by a driver or operator as well as a steering angle sensor 5 for outputting a detection signal indicative of a steering angle θs.

On the other hand, the motor vehicle is equipped with a vehicle speed sensor 6 for generating a detection signal indicative of a vehicle speed Vo.

The detection signals derived from the outputs of the various sensors 4 to 6 mentioned above (i.e., the signals indicative of the vehicle speed Vo, the steering angle θs of the steering mechanism 3 and the steering torque Ts, respectively) are inputted to the controller 10 which responds thereto by supplying to the electric motor 7 a motor current im generated on the basis of the steering angle θs as well as magnitude and direction of the steering torque Ts to thereby drive the electric motor 7.

The electric motor 7 is operatively or mechanically coupled to the steering mechanism 3 and generates a steering assist torque Ta applied to the steering wheel in accordance with the motor current im supplied from the controller 10.

To this end, the controller 10 includes a power supply circuit 11, an interface 12, a control unit generally denoted by 13, a motor drive circuit 18, a motor current detecting means 19, a relay driving circuit 20 and a fail relay 21.

The power supply circuit 11 is connected to the vehicle-onboard battery 1 by way of the ignition switch 2 and designed to supply an electric power to the control unit 13 when the ignition switch 2 is closed (i.e., turned on).

For performing control of the electric motor 7, the control unit 13 includes a steering assist torque control means 14, a steering angle detecting means 15, a steering velocity detecting means 16 and an abnormality decision means 17.

The motor drive circuit 18 supplies the motor current im to the electric motor 7 under the control of the control unit 13.

On the other hand, the motor current detecting means 19 is designed to detect the motor current im being supplied to the electric motor 7.

The relay driving circuit 20 is designed to drive or actuate the fail relay 21 when occurrence of abnormality is detected or decided by the control unit 13.

The fail relay 21 is supplied with electric power from the battery 1 to thereby stop operation of the motor drive circuit 18 in response to the relay driving circuit 20.

The steering angle detecting means 15 incorporated in the control unit 13 is designed to detect the steering angle θs of the steering mechanism 3 on the basis of the detection signal derived from the output of the steering angle sensor 5. The steering angle θs is then inputted to the steering assist torque control means 14, the steering velocity detecting means 16 and the abnormality decision means 17 as the steering angular information.

Further, the steering velocity detecting means 16 is designed to detect a steering angular velocity Vs on the basis of the rate of change of the steering angle θs as a function of time to thereby input a steering angular velocity Vs as the steering angular information to the steering assist torque control means 14 and the abnormality decision means 17.

When the steering angle signal θs or the steering velocity signal Vs indicates an abnormal value (when the steering angle θs or the steering angular velocity Vs exceeds a maximum permissible value θmax or Vmax), the abnormality decision means 17 supplies to the steering assist torque control means 14 an abnormality decision signal indicating that the steering angle detecting means 15 including the steering angle sensor 5 or the steering velocity detecting means 16 suffers failure or abnormality.

At this juncture, it is to be added that in the system arrangement shown in FIG. 12, the steering angle θs and the steering angular velocity Vs are detected as the steering angular information of the steering mechanism 3 while the motor current im is detected as rotational information of the electric motor 7.

The abnormality decision means 17 incorporated in the control unit 13 compares the steering angle θs and the steering angular velocity Vs with the maximum permissible values θmax and Vmax, respectively, which conform with the vehicle speed Vo. When the steering angle θs exceeds the maximum permissible value θmax or alternatively when the steering angular velocity Vs exceeds the maximum permissible value Vmax, the abnormality decision means 17 decides that the steering angle detecting means 15 or the steering velocity detecting means 16 is in a failure state (i.e., the state suffering abnormality).

Further, the abnormality decision means 17 is so designed as to decide as an abnormal state such situation where the steering angle θs remains unchanged notwithstanding the change of the steering torque Ts brought about by the steering operation.

As is apparent from the foregoing, in the conventional motor-driven power steering system described above, parameters such as the vehicle speed Vo and the steering torque Ts which do not directly reflect the actual rotational operation of the steering mechanism 3 are adopted in the conditions for making decision as to occurrence of abnormality in the steering angle detecting means 15 and the steering velocity detecting means 16. Consequently, great difficulty is encountered in setting the conditions for the abnormality decision, giving rise to a problem that abnormality decision can not be made with high accuracy and reliability.

SUMMARY OF THE INVENTION

In the light of the state of the art described above, it is an object of the present invention to provide a motor-driven power steering control apparatus which is capable of making decision as to abnormality with ease and high accuracy upon occurrence of abnormality in the steering angle detecting means or the steering velocity detecting means by resorting to the use of only the parameters which directly reflect the actual rotational operation of the steering mechanism without making use of the vehicle speed and the steering torque in the abnormality decision conditions.

In view of the above and other objects which will become apparent as the description proceeds, there is provided according to a general aspect of the present invention a control apparatus for a motor-driven power steering system of a motor vehicle, which apparatus includes a steering mechanism operatively coupled to wheels of the motor vehicle for steering it in response to a steering torque transmitted from a steering wheel, a steering angular information detecting means for detecting steering angular information of the steering mechanism, a torque detecting means for detecting the steering torque of the steering mechanism, a controller for controlling a motor current on the basis of the steering angular information and magnitude and direction of the steering torque, an electric motor mechanically coupled to the steering mechanism for generating a steering assist torque corresponding to the motor current, the steering assist torque being applied to the steering wheel, a motor-rotational information detecting means for detecting rotational information of the electric motor, and an abnormality decision means designed to make decision that the steering angular information detecting means is abnormal when a difference between the steering angular information and the rotational information is not smaller than a reference value preset for comparison.

With the arrangement of the motor-driven power steering control apparatus described above, it is possible to make decision as to abnormality of the steering angular information detecting means with high accuracy and reliability by making use of only the parameters which reflect directly the actual rotational operation of the steering mechanism without involving substantially any appreciable complexity in the system configuration.

The above and other objects, features and attendant advantages of the present invention will more easily be understood by reading the following description of the preferred embodiments there of taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
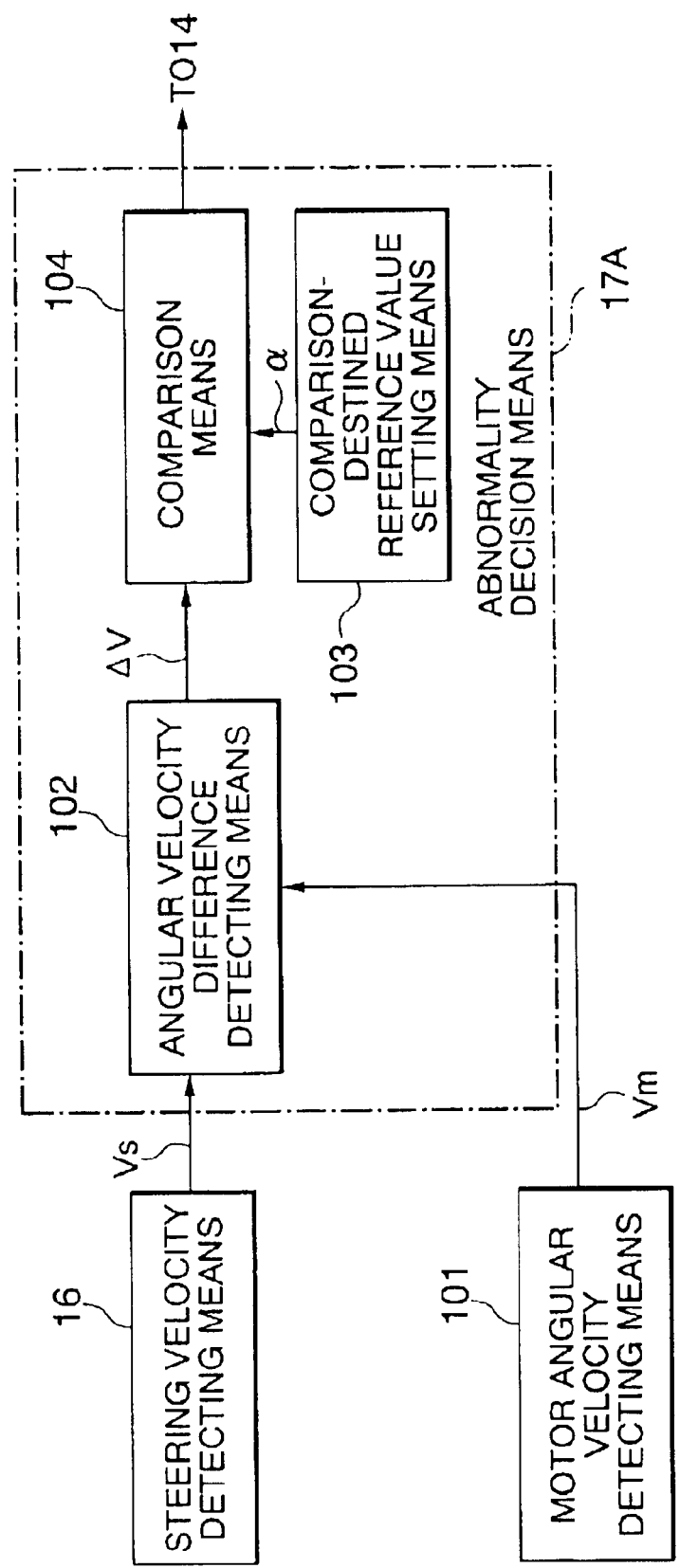
FIG. 1 is a block diagram showing an arrangement of an abnormality decision means of a motor-driven power steering control apparatus for a motor vehicle according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

FIG. 1 is a block diagram showing generally and schematically an arrangement of an abnormality decision means 17A incorporated in the control unit of the motor-driven power steering control apparatus according to a first embodiment of the present invention.

Figure 12:
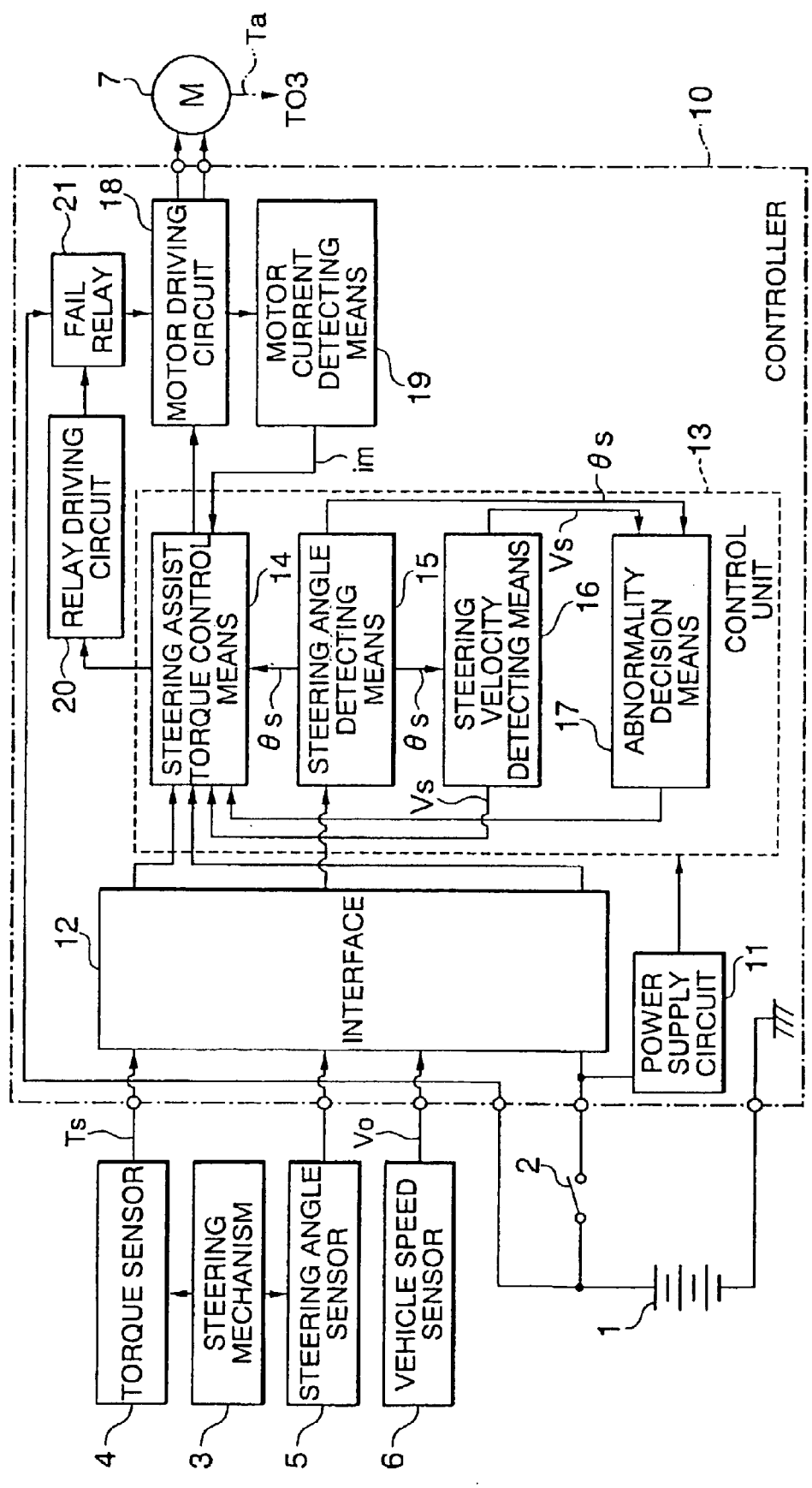
FIG. 12 is a block diagram showing a configuration of a conventional motor-driven power steering control apparatus known heretofore.

In FIG. 1, parts or components same as or equivalent to those described hereinbefore by reference to FIG. 12 are denoted by like reference numerals with or without a suffix "A" as the case may be. Further, other arrangement adopted in the instant embodiment (which is not shown in FIG. 1) is essentially same as that shown in FIG. 12.

Referring to FIG. 1, a steering velocity detecting means 16 is so designed as to detect the steering angular velocity Vs upon manipulation of the steering wheel which constitutes apart of the steering mechanism 3, as in the case of the control apparatus described hereinbefore.

A motor angular velocity detecting means 101 detects a motor angular velocity Vm as the rotational information of the electric motor 7.

In this conjunction, it is presumed that the abnormality decision means 17A is so designed as to make decision as to occurrence of abnormality in the steering velocity detecting means 16 on the basis of the steering angular information of the steering mechanism 3 and the rotational information of the electric motor 7.

More specifically, the abnormality decision means 17A makes decision as to whether or not the steering velocity detecting means 16 is in an abnormal state by comparing the steering angular velocity signal Vs outputted from the steering velocity detecting means 16 with the motor angular velocity signal Vm outputted from the motor angular velocity detecting means 101.

The abnormality decision means 17A includes an angular velocity difference detecting means 102, a comparison-destined reference value setting means 103 and a comparison means 104.

The angular velocity difference detecting means 102 is designed to detect a deviation or difference $\Delta V$ between the steering angular velocity Vs and the motor angular velocity Vm (i.e., $\Delta V$ (=|Vs−Vm|)).

The comparison-destined reference value setting means 103 is designed to set a reference value $\alpha$ for comparison with the angular velocity deviation or difference $\Delta V$ for making decision as to occurrence of abnormality in the steering velocity detecting means 16.

The comparison means 104 compares the angular velocity difference $\Delta V$ with the comparison-destined reference value $\alpha$. When a relation that $\Delta V \geq \alpha$ is satisfied, the comparison means 104 outputs an abnormality decision signal indicating abnormality of the steering velocity detecting means 16 to the steering assist torque control means 14.

Figure 2:
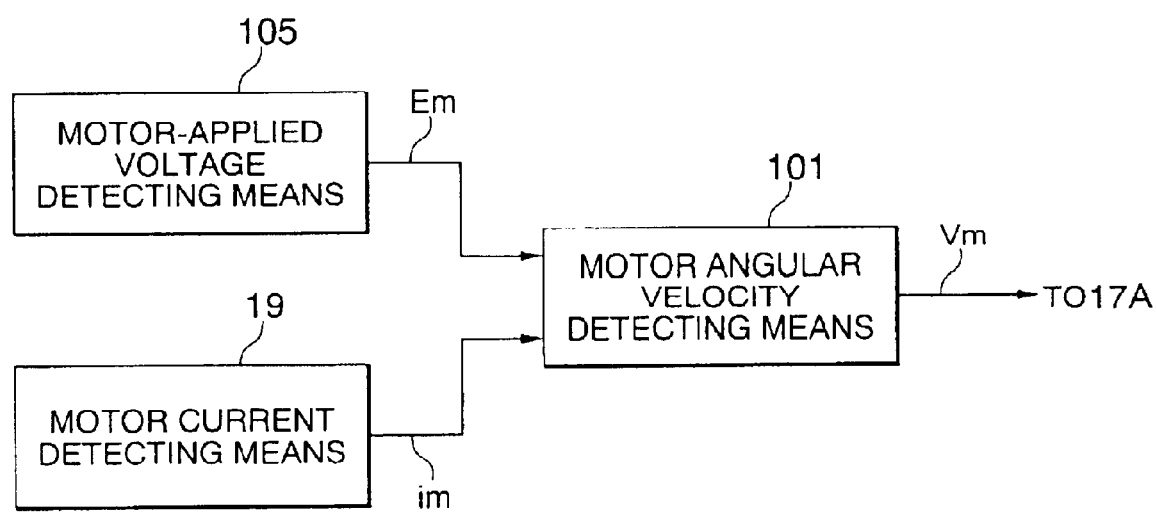
FIG. 2 is a block diagram showing concretely an arrangement of a motor angular velocity detecting means incorporated in the motor-driven power steering control apparatus according to the first embodiment of the invention.

FIG. 2 is a block diagram showing an arrangement of the motor angular velocity detecting means 101 shown in FIG. 1.

Referring to FIG. 2, the motor angular velocity detecting means 101 makes use of a motor-applied voltage (i.e., voltage applied to electric motor 7) Em derived from the output of a motor-applied voltage detecting means 105 and a motor current im derived from the output of a motor current detecting means 19 in order to detect the motor angular velocity Vm as the rotational information of the electric motor 7.

The motor-applied voltage detecting means 105 is designed to be capable of detecting the motor-applied voltage Em on the basis of a control quantity for the motor drive circuit 18 (see FIG. 12) similarly to the motor current detecting means 19.

In the case where a DC motor, for example, is employed as the electric motor 7, the motor angular velocity Vm can be determined on the basis of the motor current im supplied to the electric motor 7 and the motor-applied voltage (i.e., voltage applied to the motor 7) Em.

Next, referring to a flow chart shown in FIG. 3 together with FIG. 12, description will be made in detail of the processing operation performed by the motor-driven power steering control apparatus according to the first embodiment of the invention shown in FIGS. 1 and 2, as is well known in the art.

Figure 3:
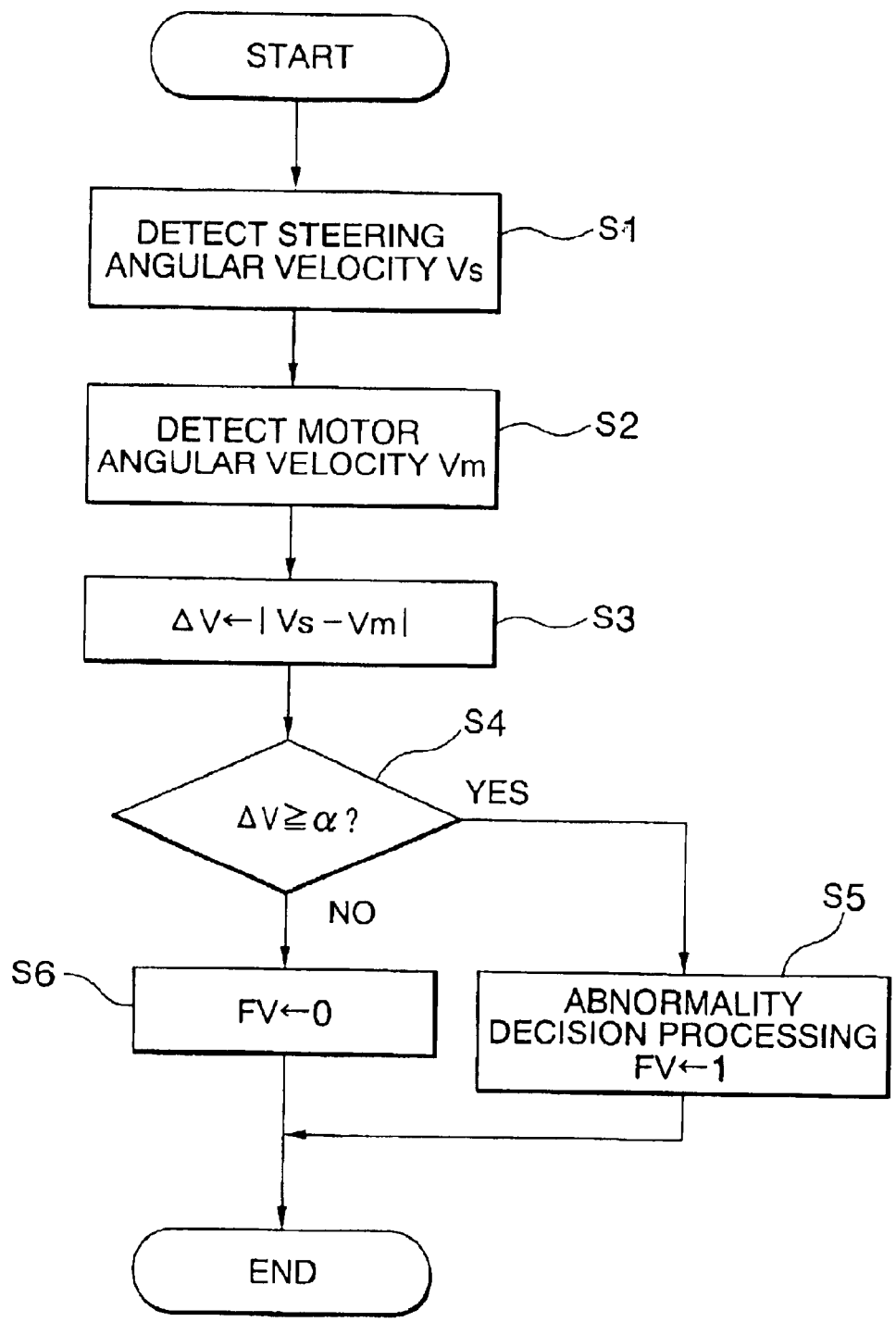
FIG. 3 is a flow chart for illustrating a processing procedure of the control apparatus according to the first embodiment of the invention.

Referring to FIG. 3, the steering velocity detecting means 16 firstly detects a steering angular velocity Vs on the basis of the steering angle $\theta s$ (step S1). On the other hand, the motor angular velocity detecting means 101 detects the motor angular velocity Vm on the basis of the motor-applied voltage Em and the motor current im (step S2).

In succession, the angular velocity difference detecting means 102 incorporated in the abnormality decision means 17A arithmetically determines the angular velocity deviation or difference $\Delta V$ (i.e., |Vs−Vm|) between the motor angular velocity Vm and the steering angular velocity Vs (step S3), while the comparison means 104 decides as to whether or not the angular velocity difference $\Delta V$ is greater than the predetermined comparison-destined reference value $\alpha$ inclusive (step S4).

When it is decided in the step S4 that $\Delta V \geq \alpha$ (i.e., when the decision step S4 results in affirmation "YES"), it is then determined that the steering velocity detecting means 16 suffers abnormality. Thus, an abnormality decision flag FV is set to "1" with an abnormality coping processing being executed (step S5), whereupon the processing routine shown in FIG. 3 is terminated (END).

By contrast, when it is decided in the step S4 that $\Delta V < \alpha$ (i.e., when the decision step S4 results in negation "NO"), this means that the steering velocity detecting means 16 is not in the abnormal state. Thus, the abnormality decision flag FV is cleared to zero "0" (step S6), whereupon the processing routine shown in FIG. 3 comes to an end (END).

In this manner, by making the abnormality decision by using the motor angular velocity Vm which accurately reflects the steering angular velocity Vs of the steering mechanism 3, abnormality of the steering angular velocity Vs detected by the steering velocity detecting means 16 (i.e., occurrence of abnormality in the steering velocity detecting means 16) can be determined with high accuracy and coped with speedily.

Embodiment 2

In the case of the motor-driven power steering control apparatus according to the first embodiment of the invention, the steering angular velocity Vs is adopted as the steering angular information with the motor angular velocity Vm being made use of as the motor rotational information. However, it is possible to make use of the steering angle $\theta s$ as the steering angular information and a motor rotation angle (i.e., rotation angle of the electric motor) $\theta m$ as the motor rotational information. A second embodiment of the invention is directed to the motor-driven power steering control apparatus which incarnates the concept mentioned just above.

Figure 4:
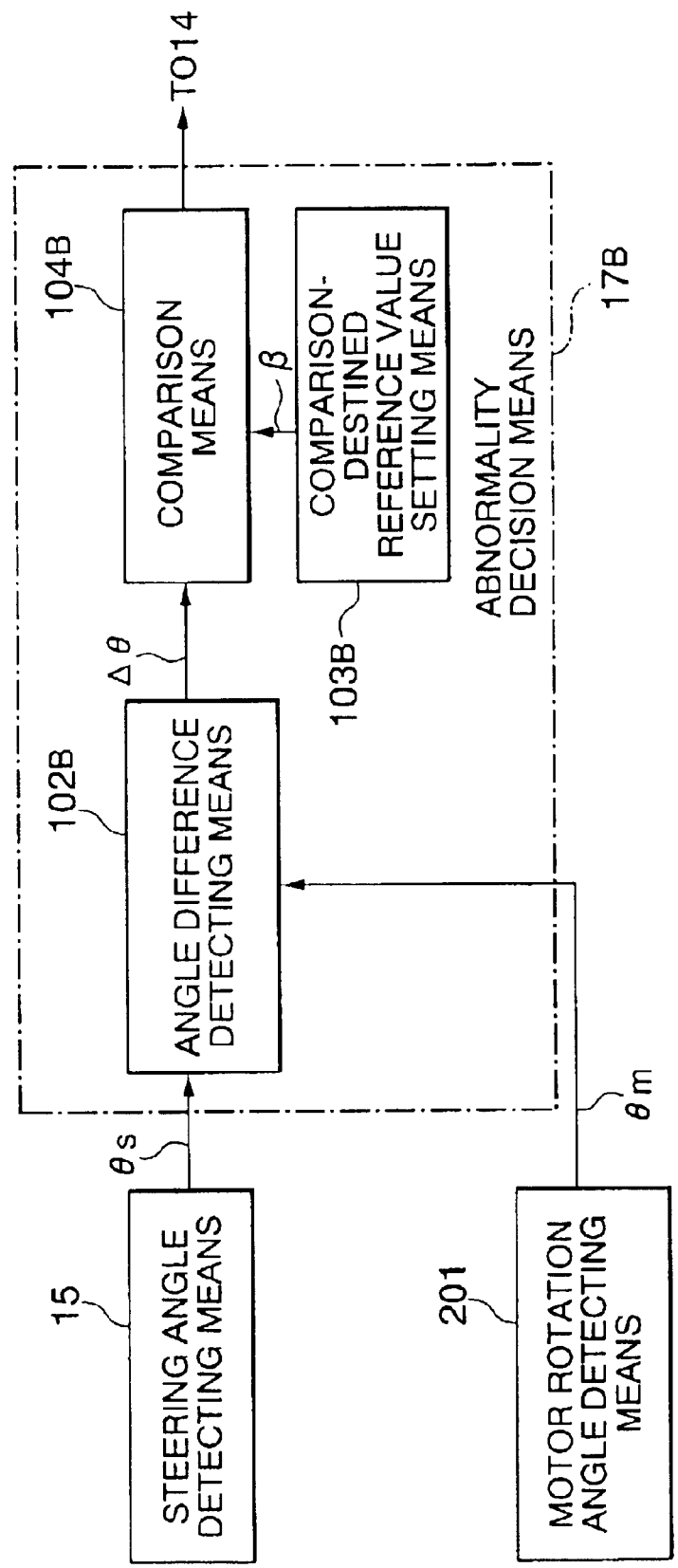
FIG. 4 is a block diagram showing an arrangement of an abnormality decision means of a motor-driven power steering control apparatus according to a second embodiment of the present invention.

FIG. 4 is a block diagram showing schematically an abnormality decision means 17B together with peripheral arrangement thereof according to a second embodiment of the present invention, wherein the steering angle $\theta s$ and the motor rotation angle $\theta m$ are made use of as the parameters for the abnormality decision.

In FIG. 4, parts or components same as or equivalent to those described hereinbefore by reference to FIGS. 12 and 1 are denoted by like reference numerals with or without a suffix "B" as the case maybe. Furthermore, other arrangement adopted in the instant embodiment which is not shown in FIG. 4 is essentially same as that shown FIG. 12.

Referring to FIG. 4, a steering angle detecting means 15 is designed to detect the steering angle $\theta s$ upon steering of the steering wheel which constitutes a part of the steering mechanism 3, as described hereinbefore.

On the other hand, a motor rotation angle detecting means 201 is designed to detect the motor rotation angle $\theta m$ as the rotational information of the electric motor 7.

With the arrangement described above, the abnormality decision means 17B makes decision as to whether or not the steering angle detecting means 15 suffers abnormality by comparing the steering angle θs derived from the output of the steering angle detecting means 15 with the motor rotation angle θm derived from the output of the motor rotation angle detecting means 201.

To this end, the abnormality decision means 17B includes an angle difference detecting means 102B, a comparison-destined reference value setting means (i.e., means for setting a reference value for the comparison described below) 103B and a comparison means 104B.

The angle difference detecting means 102B is so designed as to detect an angle deviation or difference Δθ (=|θs−θm|) between the steering angle θs and the motor rotation angle θm.

The comparison-destined reference value setting means 103B is designed to set a reference value β for comparison with the angle deviation or difference Δθ in order to validate the abnormality decision.

The comparison means 104B compares the angle difference Δθ mentioned above with the comparison-destined reference value β. When the condition that Δθ≧β is satisfied, the comparison means 104B outputs an abnormality decision signal which indicates occurrence of abnormality in the steering angle detecting means 15, the signal being then supplied to the steering assist torque control means 14.

Next, referring to a flow chart shown in FIG. 5 together with FIG. 12, description will be made in detail of the processing procedure executed by the motor-driven power steering control apparatus according to the second embodiment of the invention shown in FIG. 4.

Figure 5:
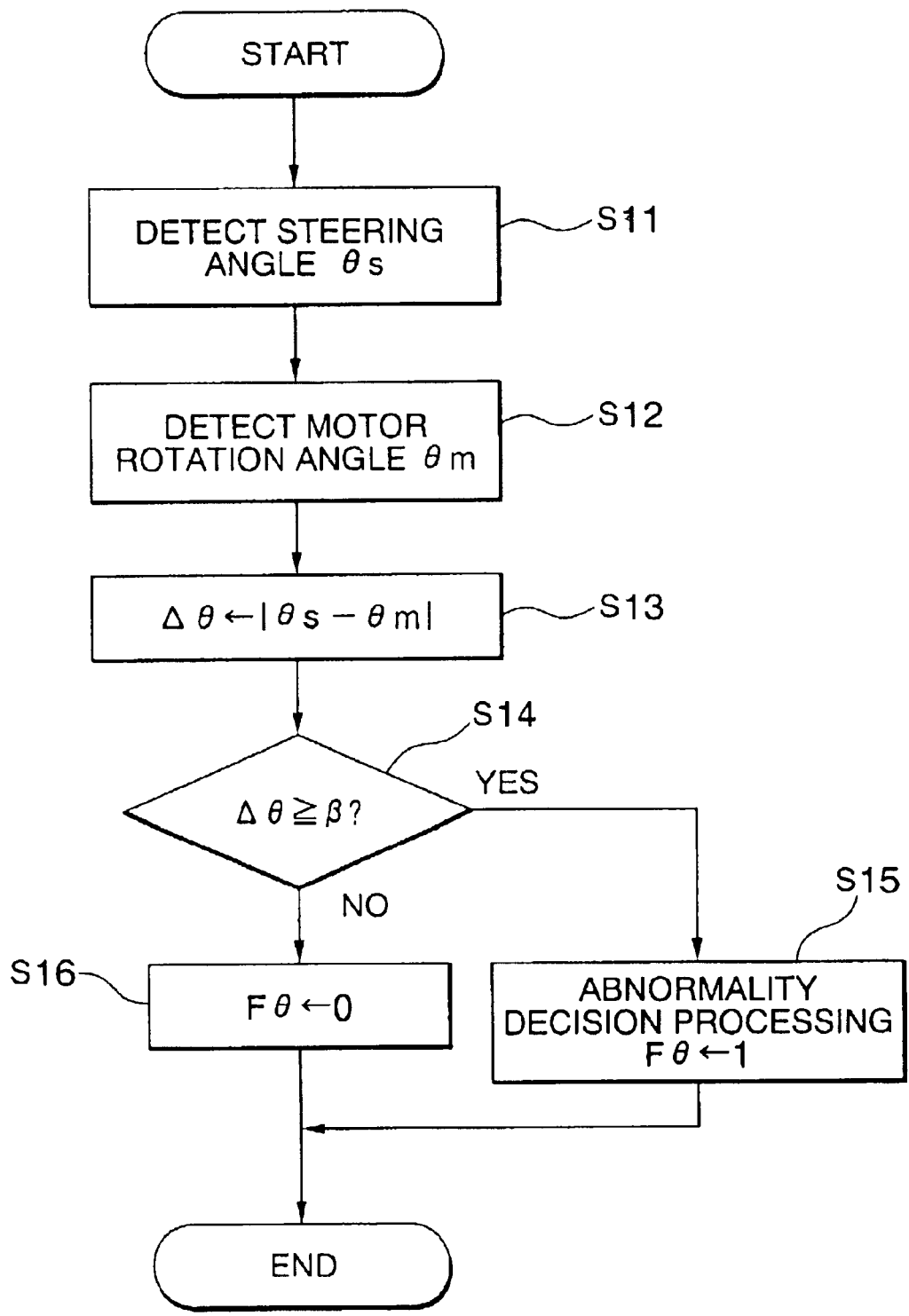
FIG. 5 is a flow chart for illustrating a processing procedure according to the second embodiment of the invention.

In FIG. 5, steps S11 to S16 correspond to the steps S1 to S6 described previously by reference to FIG. 3, wherein difference is found only in the parameters made use of in the processing.

Referring to FIG. 5, the steering angle detecting means 15 firstly fetches the steering angle signal from the output of the steering angle sensor 5 to detect the steering angle θs (step S11). On the other hand, the motor rotation angle detecting means 201 detects the motor rotation angle θm (step S12).

In succession, the angle difference detecting means 102B incorporated in the abnormality decision means 17B arithmetically determines the angle deviation or difference Δθ (=|θs−θm|) between the steering angle θs and the motor rotation angle θm (step S13). The comparison means 104B makes decision as to whether or not the angle difference Δθ is greater than the predetermined comparison-destined reference value β inclusive (step S14).

When it is decided in the step S14 that Δθ≧β (i.e., when the decision step S14 results in "YES"), it can then be regarded that the steering angle detecting means 15 is abnormal. Accordingly, the abnormality decision flag Fθ is set to "1" and a processing for coping with the abnormality is executed (step S15), whereupon the processing routine shown in FIG. 5 is terminated (END).

On the contrary, when it is decided in the step S14 that Δθ<β (i.e., when the decision step S14 results in "NO")), this means that the steering angle detecting means 15 is normal. Accordingly, the abnormality decision flag Fθ is cleared to zero "0" (step S16), whereupon the processing routine shown in FIG. 5 comes to an end.

In this way, by making abnormality decision by using the motor rotation angle θm which accurately reflects the steering angle θs of the steering mechanism 3, it is possible to determine with high accuracy and reliability that the steering angle θs detected by the steering angle detecting means 15 is abnormal, indicating that an abnormal event is taking place in the steering angle detecting means 15, whereby proper measures can speedily be taken for coping with the abnormal event.

Embodiment 3

In the case of the motor-driven power steering control apparatuses according to the first and second embodiments of the invention, no concrete description has been made of the processing to be executed when the abnormality decision is made. In this conjunction, it is conceived to disable the control of the electric motor 7 based on the steering angular information immediately when abnormality is determined.

Figure 6:
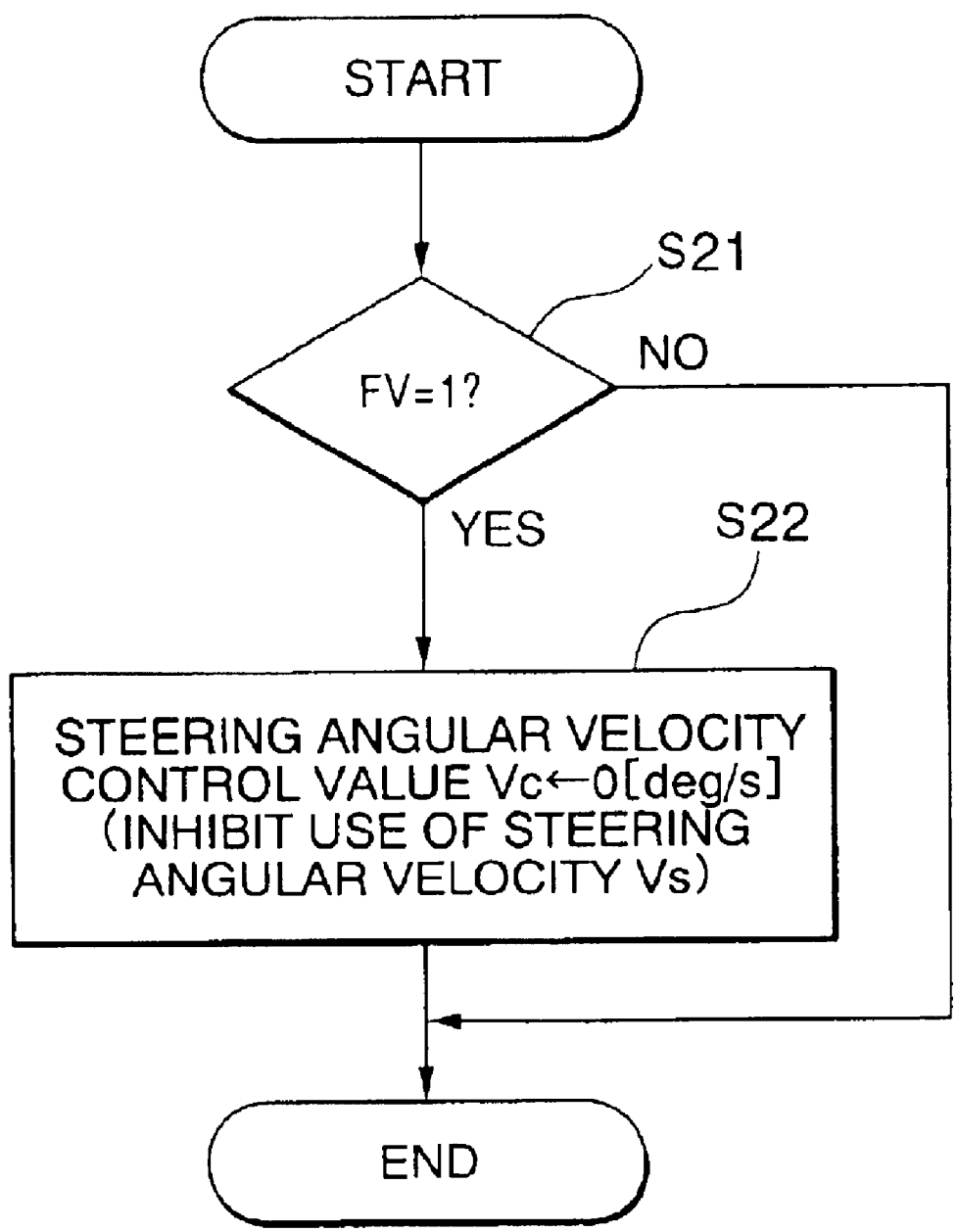
FIG. 6 is a flow chart for illustrating an abnormality decision processing procedure for a steering velocity detecting means according to a third embodiment of the present invention.
Figure 7:
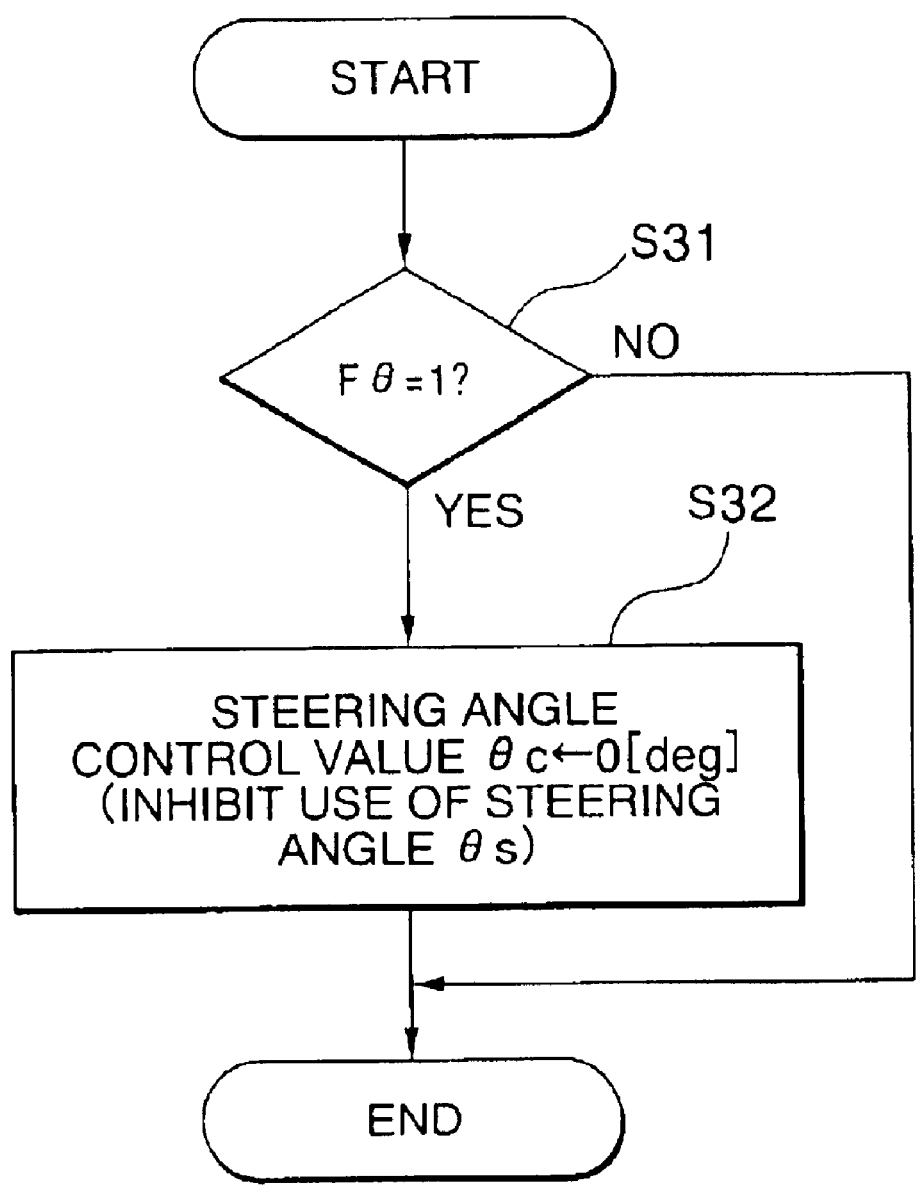
FIG. 7 is a flow chart for illustrating an abnormality decision processing procedure for a steering angle detecting means according to the third embodiment of the present invention.

FIGS. 6 and 7 are flow charts for illustrating processing procedures according to a third embodiment of the present invention in which the steering angular information is invalidated immediately when abnormality is decided.

FIG. 6 shows a processing routine where the steering angular velocity Vs is employed as the steering angular information, while FIG. 7 shows a processing routine where the steering angle θs is employed as the steering angular information.

In the motor-driven power steering control apparatus according to the third embodiment of the invention, the steering assist torque control means 14 incorporated in the controller 10 (see FIG. 12) includes a steering angular information disabling means which is so designed as to disable or invalidate the steering angular information for the control of the motor current im immediately when abnormality of the steering angular information detecting means (i.e., the steering velocity detecting means 16 or the steering angle detecting means 15) is decided by the abnormality decision means 17A or 17B.

More specifically, when the abnormality decision flag FV is set to "1" in the step S5 in the abnormality decision processing described previously by reference to FIG. 3, the inhibit or invalidate processing illustrated in FIG. 6 is executed, while the invalidate processing illustrated in FIG. 7 is executed when the abnormality decision flag Fθ is set to "1" in the step S15 in the abnormality decision processing described hereinbefore by reference to FIG. 5.

Referring to FIG. 6, decision is firstly made by the steering assist torque control means 14 in a step S21 as to whether or not the abnormality decision flag FV is set to "1" by the abnormality decision means 17A (see FIG. 1).

When it is decided in the step S21 that FV="1" (i.e., when the decision step S21 results in "YES"), this means that abnormality of the steering velocity detecting means 16 is detected. Accordingly, the steering velocity control value Vc is immediately set to "0" [deg/s] while inhibiting the use of the steering angular velocity Vs (step S22), whereupon the processing routine shown in FIG. 6 comes to an end.

On the other hand, when it is decided in the step S21 that FV="0" (i.e., when the decision step S21 results in "NO"), this means that the steering velocity detecting means 16 is normal. Accordingly, the processing routine illustrated in FIG. 6 is terminated without executing the control inhibit step S22.

In this manner, when abnormality of the steering velocity detecting means 16 is determined, the control can be carried out without undergoing the influence of the abnormality by immediately invalidating contribution of the steering angular velocity Vs to the control value Vc.

Similarly, in the case where the steering angle θs is made use of, decision is made in a step S31 shown in FIG. 7 whether or not the abnormality decision flag Fθ is set to "1" by the abnormality decision means 17B (see FIG. 4).

When it is decided in the step S31 that Fθ="1" (i.e., when the decision step S31 results in "YES"), this means that abnormality of the steering angle detecting means 15 has been detected. Accordingly, the steering angle control value θc is immediately set to "0" [deg] while invalidating contribution of the steering angle θs (step S32), whereupon the processing routine shown in FIG. 7 comes to an end.

On the contrary, when it is decided in the step S31 that Fθ="0" (i.e., when the decision step S31 results in "NO"), this means that the steering angle detecting means 15 is normal. In that case, the processing routine shown in FIG. 7 is terminated without executing the control inhibit step S32.

In this manner, even when abnormality of the steering angle detecting means 15 is determined, the control can be carried out without undergoing the influence of the fault by immediately inhibiting the use of the steering angle θs as the control value θc.

Thus, in the case where the steering angular velocity Vs or the steering angle θs is made use of as the steering information, the abnormal value derived from the steering angular information detecting means upon abnormality decision is positively prevented from being reflected in the control procedure, whereby reliability can be ensured for the control of the electric motor.

Embodiment 4

In the motor-driven power steering control apparatus according to the third embodiment of the invention, the control value Vc or θc is set to zero immediately upon decision of abnormality to thereby invalidate the steering angular information. However, it is possible to store the control value immediately before the abnormality decision is made and use this preceding control value immediately after the abnormality is determined with the control value Vc or θc being gradually decreased or decremented to zero from the preceding control value.

Figure 8:
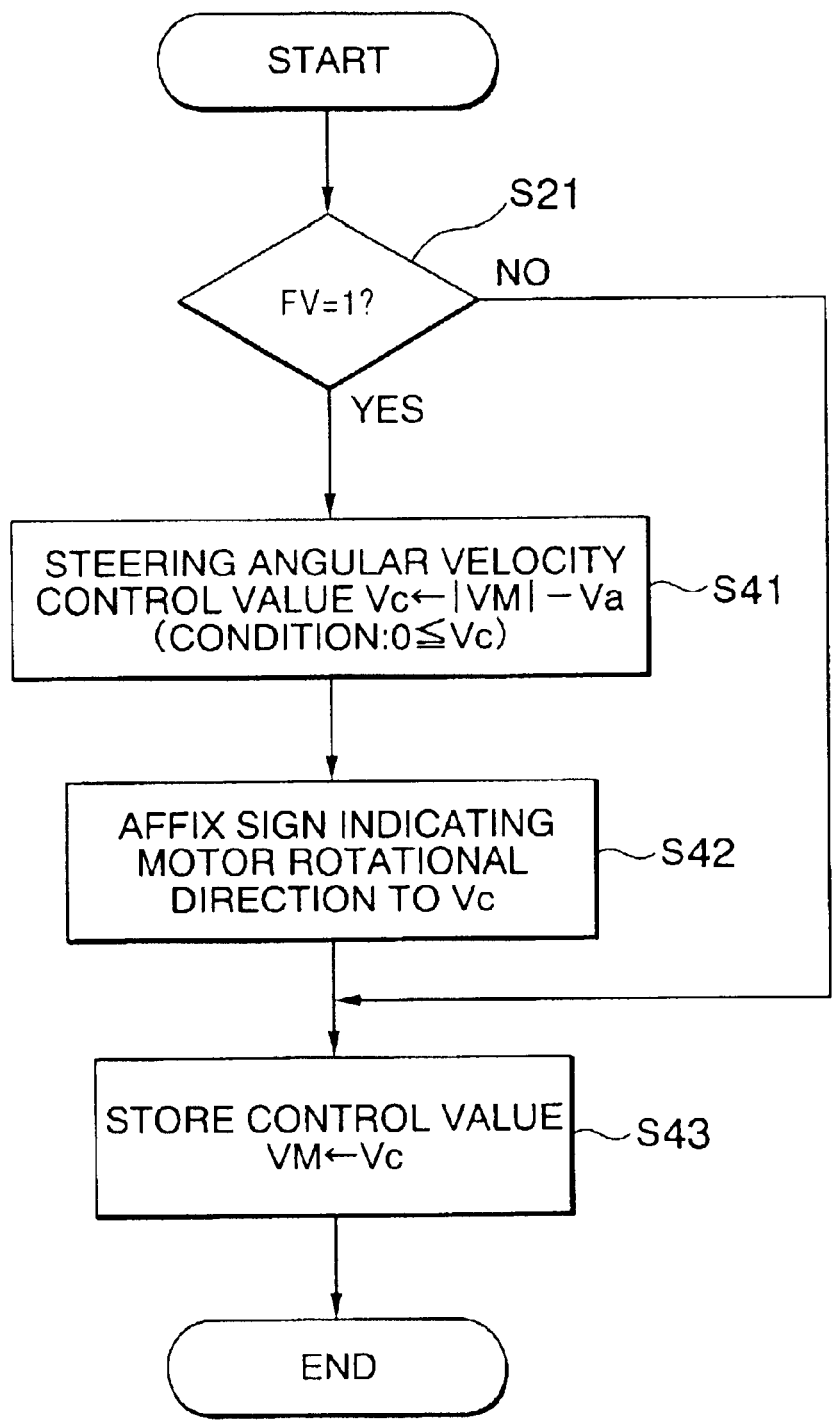
FIG. 8 is a flow chart for illustrating a processing procedure executed upon abnormality decision for the steering velocity detecting means according to a fourth embodiment of the present invention.
Figure 9:
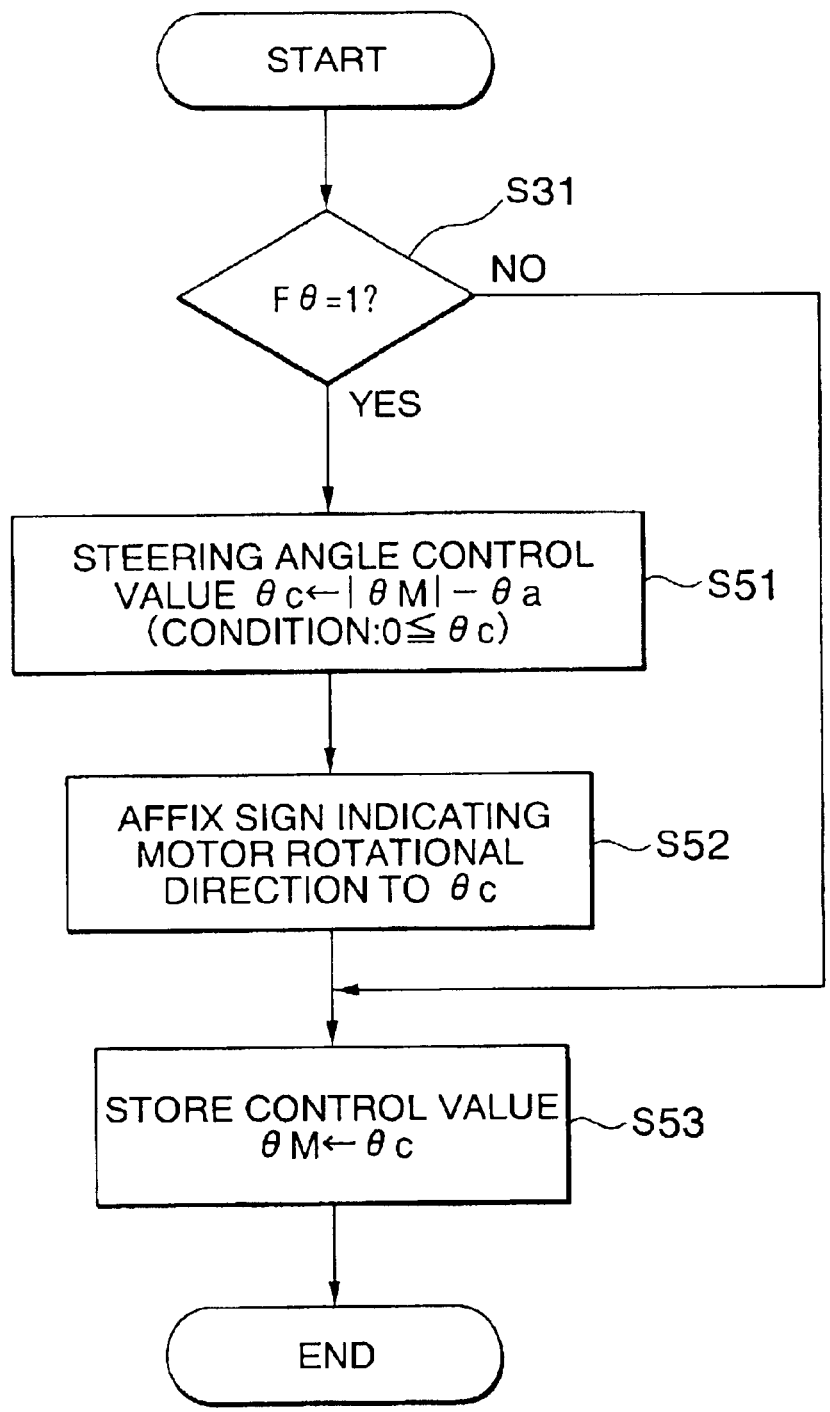
FIG. 9 is a flow chart for illustrating a processing procedure executed upon abnormality decision for the steering angle detecting means according to the fourth embodiment of the invention.

FIGS. 8 and 9 are flow charts for illustrating processing procedures according to a fourth embodiment of the present invention in which the control value is gradually decreased to zero while using the preceding control value in the abnormality decision.

In the processing procedure shown in FIG. 8, the steering angular velocity Vs is made use of as the steering angular information, while in the processing procedure shown in FIG. 9, the steering angle θs is used as the steering angular information. In these figures, the steps 21 and 31 are same as those described previously by reference to FIGS. 6 and 7.

In the motor-driven power steering control apparatus according to the fourth embodiment of the invention, the steering assist torque control means 14 incorporated in the controller 10 (see FIG. 12) includes a steering angular information storing means which is adapted to store constantly the steering angular information. When it is decided by the abnormality decision means 17A or 17B that the steering angular information detecting means (the steering velocity detecting means 16 or the steering angle detecting means 15) is abnormal, the preceding steering angular information stored immediately before the abnormality decision has been made is used for controlling the motor current im and the preceding steering angular information is gradually lessened or diminished to zero.

In other words, in the control apparatus now under consideration, the steering angular information (control value) used for the control of the motor current is not immediately set to zero (i.e., not immediately invalidated), differing from the control apparatuses, described previously in conjunction with the third embodiment, but the measures are adopted for gradually lessening the influence of the abnormality of the steering angular information detecting means by making use of the data stored before such abnormality has occurred.

Now, reference is made to FIG. 8. Decision is firstly made as to whether or not the abnormality decision flag FV is set to "1" (step S21). When it is decided in the step S21 that FV="1" (i.e., "YES" in the step S21), this means that abnormality of the steering velocity detecting means 16 has been detected. Accordingly, the control value Vc for the steering angular velocity Vs is set in accordance with the under mentioned expression (1) (step S41):

$$Vc = |VM| - Va \qquad (1)$$

where VM represents the control value stored in the preceding processing routine (i.e., preceding control value), and Va represents a predetermined value by which the control value Vc is gradually decreased or decremented.

As is apparent from the above-mentioned expression (1), the control value Vc is determined through absolute value arithmetic operation. Therefore, the condition that Vc≧0 is imposed on the arithmetic operation and the processing for decreasing the control value Vc is stopped when this value becomes zero.

Subsequently, a sign indicating the rotating direction of the electric motor 7 is affixed to the control value Vc (step S42), and the motor current im is supplied to the electric motor 7 by way of the motor drive circuit 18 (see FIG. 12).

Finally, the current control value Vc is registered as the preceding control value VM which is thus updated (step S43), whereupon the processing routine shown in FIG. 8 comes to an end.

On the other hand, when it is decided in the step S21 that FV=0 (i.e., "NO" in the step S21), this means that the steering velocity detecting means 16 is in the normal state. Accordingly, the step S43 of updating the preceding control value VM is immediately executed without carrying out the processing steps S41 and S42, whereupon the processing routine shown in FIG. 8 is terminated.

In the case where the processing routine shown in FIG. 8 is executed next time in the abnormality decision procedure, the value resulting from further subtraction of the predetermined value Va from the preceding control value VM is used as the control value Vc. In this manner, the control value Vc is gradually decreased until it becomes zero.

As is apparent from the above, it is taught according to the invention incarnated in the instant embodiment that when the abnormality decision flag FV is set to "1" (i.e., when abnormality is taking place), the value obtained by subtracting the predetermined value Va from the control value VM stored in the preceding routine is used as the control value VM in the succeeding processing routine. Thus, when the steering angular velocity Vs becomes abnormal, the influence thereof can gradually be diminished, whereby the so-called control shock which may otherwise occur immediately after detection of the abnormality can be mitigated.

Next, reference is made to FIG. 9. In the case where the steering angle θs is used as the steering angular information, decision is made in a step S31 shown in FIG. 9 as to whether or not the abnormality decision flag Fθ is set to "1". When it is decided that Fθ="1" (i.e., "YES" in the step S31), this means that the steering angle detecting means 15 suffers abnormality. Accordingly, the control value θc for the steering angle θs is set in accordance with the under mentioned expression (2) in a step S51 shown in FIG. 9:

$$\theta c = |\theta M| - \theta a \qquad (2)$$

where θM represents a control value stored in the preceding processing routine, and θa represents a predetermined value by which the control value θc is gradually decreased or decremented.

Further, as is apparent from the expression (2), the control value θc is determined through absolute value arithmetic operation, and thus the condition that θc≧0 is imposed. The subtraction processing of the control value θc is clipped at "0" (zero).

In succession, a sign indicating the rotating direction of the electric motor 7 is affixed to the control value θc (step S52), and the motor current im is supplied to the electric motor 7 by way of the motor drive circuit 18 (see FIG. 12).

Finally, the current control value θc is registered as the preceding control value θM which is thus updated (step S53), whereupon the processing routine shown in FIG. 9 is terminated.

On the other hand, when it is decided in the step S31 that Fθ=0 (i.e., "NO" in the step S31), this means that the steering angle detecting means 15 is in the normal state. Accordingly, the step S53 of updating the preceding control value θM is immediately executed with the steps S51 and S52 being skipped, whereupon the processing routine shown in FIG. 9 comes to an end.

In this manner, when the abnormality decision flag Fθ is set to "1" (i.e., upon occurrence of abnormality), the value obtained by subtracting the predetermined value θa from the preceding control value θM (i.e., control value stored in the preceding processing routine) is used as the control value θM (i.e., control value for the processing routine succeeding to the preceding routine). As a result of this, when the steering angle θs becomes abnormal, the influence of the abnormality can gradually be diminished while the control shock which may be brought about by the abnormality decision can effectively be mitigated.

In this manner, regardless of whether the steering information is the steering angular velocity Vs or the steering angle θs, the abnormal value derived from the output of the steering angular information detecting means upon abnormality decision is not reflected in the control of the electric motor 7, whereby reliability of the control of the electric motor can be protected from degradation.

In the motor-driven power steering control apparatus according to the instant embodiment of the invention, the preceding steering angular information is diminished to "0" (zero). It should however be appreciated that the preceding steering angle information may gradually be lessened to a value (not equal to zero) at which the influence to the motor current can be ignored.

Embodiment 5

In the case of the motor-driven power steering control apparatuses according to the first to fourth embodiments of the invention described above, no concrete description has been made as to the processing for the steering velocity detecting means 16 and the steering angle detecting means 15. In this conjunction, it is possible to determine either one of the steering angular information on the basis of the other through arithmetic processing. A fifth embodiment of the present invention is directed to realization of this concept.

Figure 10:
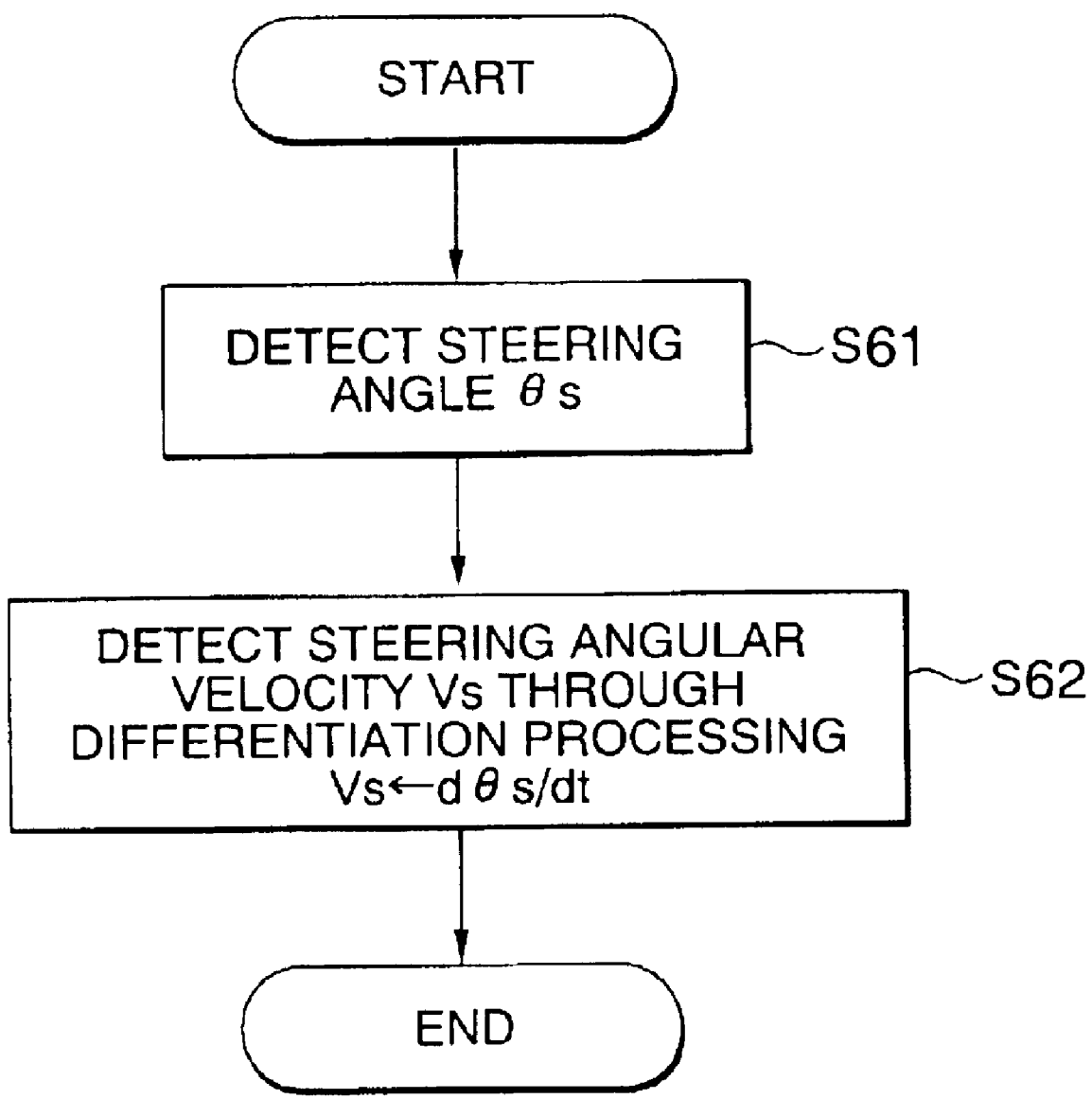
FIG. 10 is a flow chart for illustrating a processing procedure executed upon abnormality decision for the steering velocity detecting means according to a fifth embodiment of the present invention.
Figure 11:
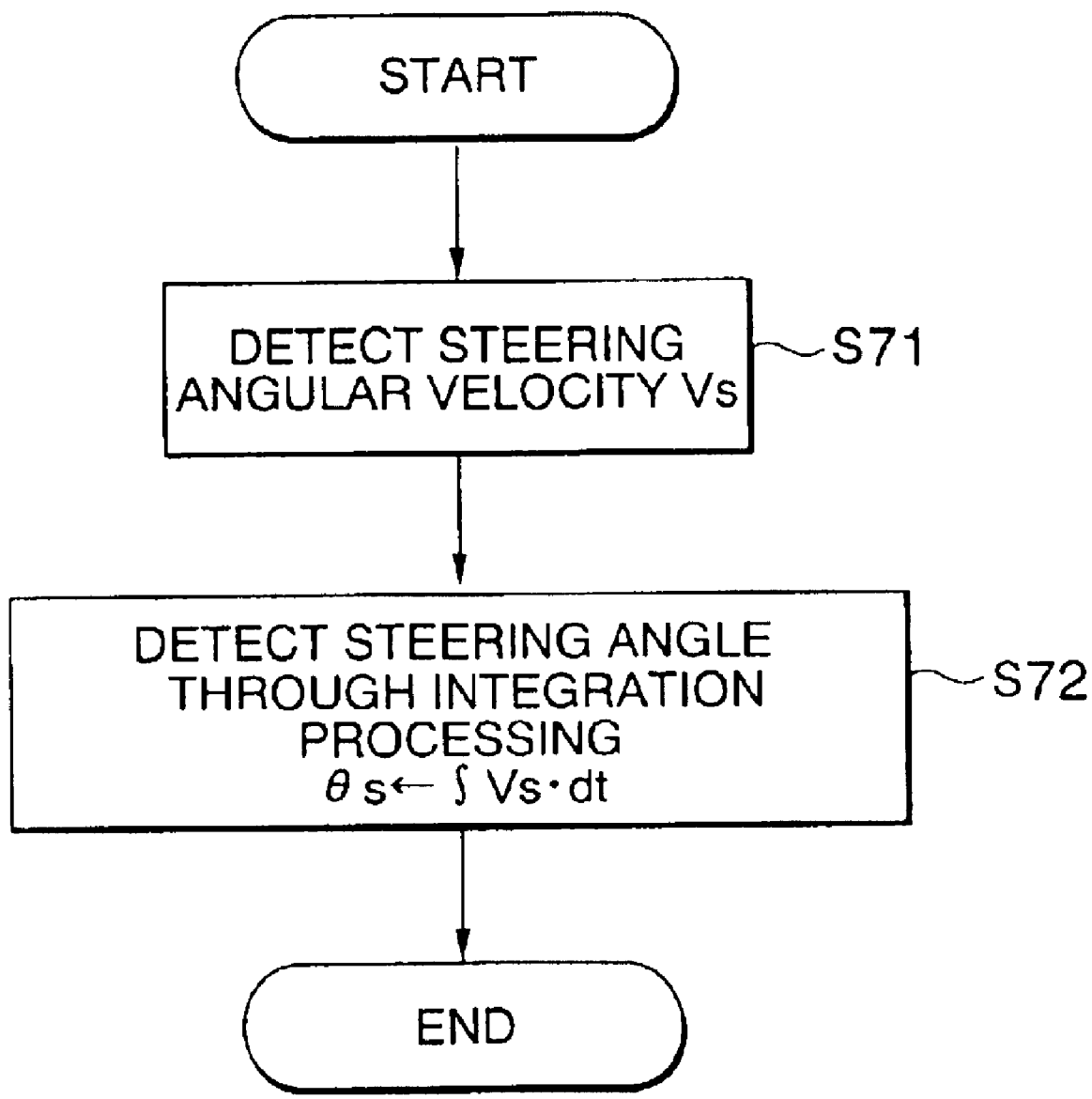
FIG. 11 is a flow chart for illustrating a processing procedure executed upon abnormality decision for the steering angle detecting means according to the fifth embodiment of the invention.

FIGS. 10 and 11 are flow charts for illustrating processing procedures according to the fifth embodiment of the invention in which one of the steering angle θs and the steering angular velocity Vs is detected through arithmetic operation based on the other.

More specifically, FIG. 10 shows a case where the steering angular velocity Vs is detected on the basis of the steering angle θs through arithmetic operation, while FIG. 11 shows a processing routine when the steering angle θs is detected on the basis of the steering angular velocity Vs through arithmetic processing.

Referring to FIG. 10, the steering velocity detecting means 16 firstly detects the steering angle θs from the output of the steering angle detecting means 15 (step S61) to detect the steering angular velocity Vs by differentiating the steering angle θs in accordance with the following expression (3) in a step S62:

$$Vs = d\theta s/dt \quad (3)$$

By detecting the steering angular velocity Vs by differentiating the steering angle θs in this way, the steering velocity detecting means 16 can substantially be spared.

On the other hand, in the case the steering angle θs is derived from the steering angular velocity Vs, the steering angle detecting means 15 detects the steering angular velocity Vs from the output of the steering velocity detecting means 16 (step S71) and succeedingly detects the steering angle θs by integrating the steering angular velocity Vs in accordance with the following expression (4) (step S72):

$$\theta s = \int Vs \cdot dt \quad (4)$$

In this way, by detecting the steering angle θs by integrating the steering angular velocity Vs, the steering angle detecting means 15 can substantially be spared.

In this way, in dependence on whether the steering angular velocity Vs or the steering angle θs is used as the steering angular information, one of the steering angle detecting means 15 and the steering velocity detecting means 16 can be spared, whereby the structure of the motor-driven power steering control apparatus can correspondingly be simplified.

Effects of the Invention

As is apparent from the foregoing, there has been provided according to the present invention the control apparatus for a motor-driven power steering system of a motor vehicle, which apparatus includes the steering mechanism operatively coupled to wheels of the motor vehicle for steering the same in response to a steering torque transmitted from the steering wheel, the steering angular information detecting means for detecting steering angular information of the steering mechanism, the torque detecting means for detecting the steering torque of the steering mechanism, the controller for controlling the motor current on the basis of the steering angular information and magnitude and direction of the steering torque, the electric motor mechanically coupled to the steering mechanism for generating a steering assist torque corresponding to the motor current, the steering assist torque being applied to the steering wheel, the motor-rotational information detecting means for detecting rotational information of the electric motor, and the abnormality decision means designed to make decision that the steering angular information detecting means is abnormal when difference between the steering angular information and the rotational information of the motor is not smaller than the reference value preset for comparison.

With the arrangement of the motor-driven power steering control apparatus described above, it is possible to make decision as to abnormality of the steering angular information detecting means with high accuracy and reliability by making use of only the parameters which reflect directly the actual rotational operation of the steering mechanism without involving complexity in the system configuration.

In the control apparatus for the motor-driven power steering system mentioned above, the steering angular information detecting means can be composed of the steering velocity detecting means for detecting a steering angular velocity of the steering mechanism with the motor-rotational information detecting means being composed of the motor angular velocity detecting means for detecting an angular velocity of the electric motor. Further, the abnormality decision means can be so designed as to decide that the steering velocity detecting means is abnormal when difference between the steering angular velocity and the motor angular velocity is not smaller than the reference value preset for comparison.

By virtue of the arrangement described just above, abnormality of the steering angular velocity detecting means can be detected with ease and high accuracy.

In the control apparatus for the motor-driven power steering system mentioned just above, the steering angular information detecting means can be composed of the steering angle detecting means for detecting the steering angle of the steering mechanism. In that case, the steering velocity detecting means can be so designed as to detect the steering angular velocity through a processing of differentiating the steering angle.

With the arrangement described just above, the structure of the control apparatus can be simplified.

In the control apparatus for the motor-driven power steering system mentioned above, the steering angular information detecting means can be composed of the steering angle detecting means for detecting a steering angle of the steering mechanism with the motor-rotational information detecting means being composed of the motor rotation angle detecting means for detecting a rotation angle of the electric motor. In that case, the abnormality decision means can be so designed as to decide that the steering angle detecting means is abnormal when difference between the steering angle and the motor rotation angle is not smaller than a reference value preset for comparison.

Owing to the arrangement described just above, it is possible to decide or detect the abnormality of the steering angle detecting means with ease and high accuracy.

In the control apparatus for the motor-driven power steering system mentioned just above, the steering angular information detecting means can be composed of the steering velocity detecting means for detecting the steering angular velocity of the steering mechanism. In that case, the steering angle detecting means can be so designed as to detect the steering angle through a processing of integrating the steering angular velocity.

With the arrangement described just above, the control apparatus can be implemented in a simplified structure.

In the control apparatus for the motor-driven power steering system mentioned above, the controller can be composed of the steering angular information disabling means. In that case, the steering angular information can immediately be invalidated for use in controlling the motor current, when the steering angular information detecting means is decided to be abnormal by the abnormality decision means.

With the arrangement described just above, influence of the abnormality to the control of the electric motor can positively be avoided.

In the control apparatus for the motor-driven power steering system mentioned above, the controller can be composed of the steering angular information storing means for storing constantly the steering angular information. In that case, the controller can be so arranged that when the steering angular information detecting means is decided to be abnormal by the abnormality decision means, preceding steering angular information stored immediately before the steering angular information detecting means has been decided to be abnormal is used for controlling the motor. Further, the preceding steering angular information can gradually be lessened so that influence of abnormality of the steering angular information detecting means to the control of the motor current is gradually diminished.

By virtue of the arrangement described just above, adverse influence of the abnormality to the control of the electric motor can be evaded. Thus, control shock which could otherwise take place upon detection of the abnormality can be avoided.

Many modifications and variations of the present invention are possible in the light of the above techniques. It is therefore to be understood that within the scope of the appended claims, the invention may be practiced otherwise than as specifically described.

What is claimed is:

1. A control apparatus for a motor-driven power steering system of a motor vehicle, comprising:

a steering mechanism operatively coupled to wheels of said motor vehicle for steering it in response to a steering torque transmitted from a steering wheel;

steering angular information detecting means for detecting steering angular information of said steering mechanism;

torque detecting means for detecting said steering torque of said steering mechanism;

a controller for controlling a motor current on the basis of said steering angular information and magnitude and direction of said steering torque, an electric motor mechanically coupled to said steering mechanism for generating a steering assist torque corresponding to said motor current, said steering assist torque being applied to said steering wheel;

motor-rotational information detecting means for detecting rotational information of said electric motor; and abnormality decision means designed to make decision that said steering angular information detecting means is abnormal when a difference between said steering angular information and said rotational information is not smaller than a reference value preset for comparison.

2. A control apparatus for a motor-driven power steering system according to claim 1, said steering angular information detecting means including steering velocity detecting means for detecting a steering angular velocity of said steering mechanism, said motor-rotational information detecting means including motor angular velocity detecting means for detecting an angular velocity of said electric motor, wherein said abnormality decision means is so designed as to decide that said steering velocity detecting means is abnormal when difference between said steering angular velocity and said motor angular velocity is not smaller than a reference value preset for comparison.

3. A control apparatus for a motor-driven power steering system according to claim 2, said steering angular information detecting means including steering angle detecting means for detecting a steering angle of said steering mechanism, wherein said steering velocity detecting means is so designed as to detect said steering angular velocity through a processing of differentiating said steering angle.

4. A control apparatus for a motor-driven power steering system according to claim 1, said steering angular information detecting means includes steering angle detecting means for detecting a steering angle of said steering mechanism, said motor-rotational information detecting means including motor rotation angle detecting means for detecting a rotation angle of said electric motor, wherein said abnormality decision means is so designed as to decide that said steering angle detecting means is abnormal when angle difference between said steering angle and said motor rotation angle is not smaller than a reference value preset for comparison.

5. A control apparatus for a motor-driven power steering system according to claim 4, said steering angular information detecting means including steering velocity detecting means for detecting a steering angular velocity of said steering mechanism, wherein said steering angle detecting means is so designed as to detect said steering angle through a processing of integrating said steering angular velocity.

6. A control apparatus for a motor-driven power steering system according to claim 1, said controller including steering angular information disabling means, wherein when said steering angular information detecting means is decided to be abnormal by said abnormality decision means, said steering angular information is immediately invalidated for use in controlling said motor current.

7. A control apparatus for a motor-driven power steering system according to claim 1, said controller including steering angular information storing means for storing constantly said steering angular information, wherein said controller is so designed that when said steering angular information detecting means is decided to be abnormal by said abnormality decision means, preceding steering angular information stored immediately before said steering angular information detecting means has been decided to be abnormal is used for controlling said motor current, and wherein said preceding steering angular information is gradually lessened, whereby influence of abnormality of said steering angular information detecting means to the control of said motor current is gradually diminished.

\* \* \* \* \*